Figure 1:
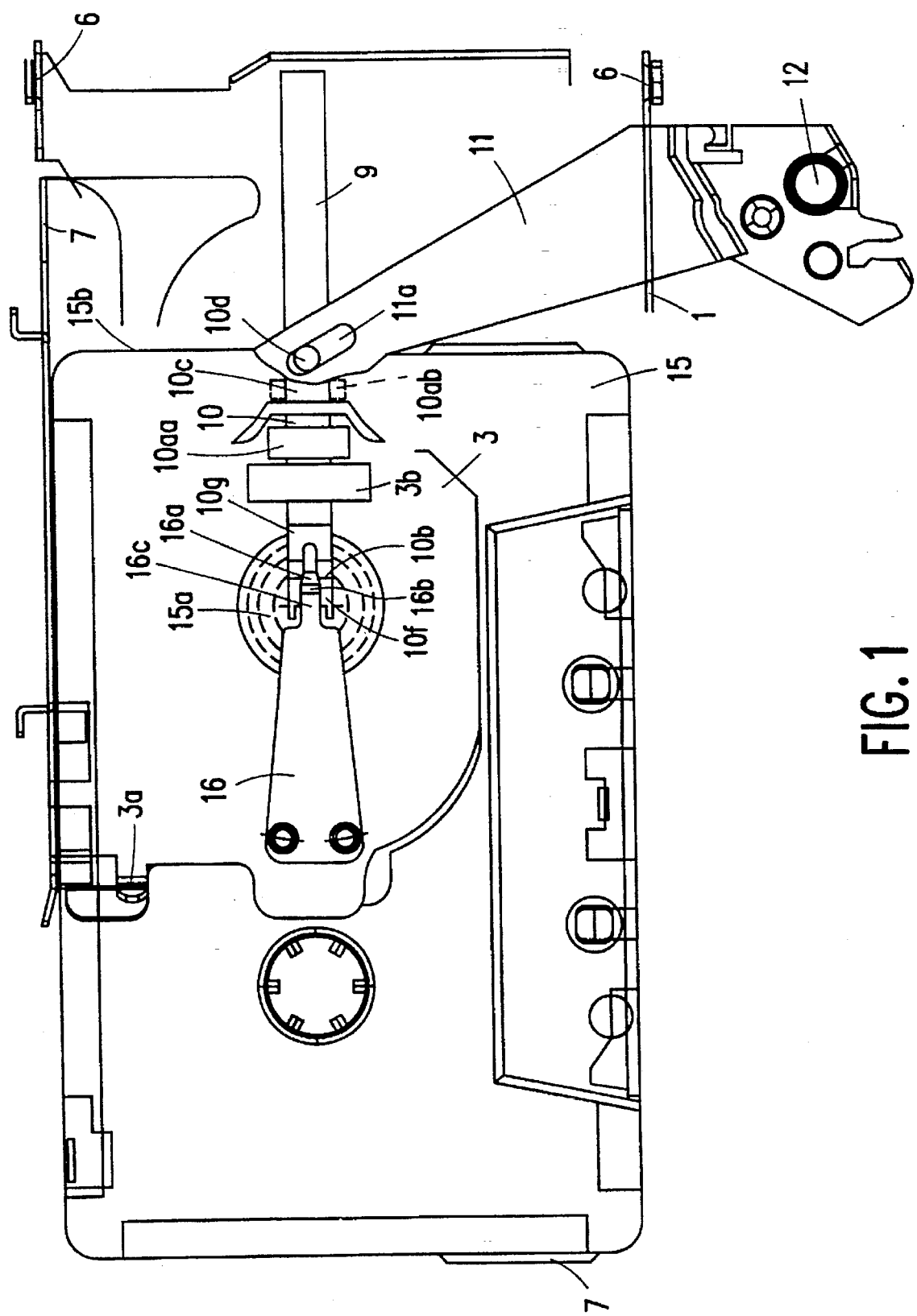

United States Patent [19]
Kunze et al.

[11] Patent Number: 5,647,549
[45] Date of Patent: Jul. 15, 1997

[54] MAGNETIC TAPE CASSETTE APPARATUS WITH DRIVE

[75] Inventors: Norbert Kunze, Wettenberg; Dieter Müller, Staufenberg; Marc Gielkens, Braunfels, all of Germany

[73] Assignee: U.S. Philips Corporation, New York, N.Y.

[21] Appl. No.: 505,413

[22] Filed: Jul. 21, 1995

[30] Foreign Application Priority Data

Jul. 27, 1994 [DE] Germany .................... 44 26 510.7

[51] Int. Cl.⁶ .................................................. G11B 5/008
[52] U.S. Cl. ............................................... 242/338.4
[58] Field of Search ........................... 242/338, 338.4; 360/96.5, 96.6

[56] References Cited

U.S. PATENT DOCUMENTS

| | | | |
|---|---|---|---|
| 4,578,724 | 3/1986 | Beitler | 360/93 |
| 5,231,553 | 7/1993 | Weber et al. | 360/96.5 |
| 5,379,168 | 1/1995 | Kage et al. | 360/96.5 |
| 5,386,330 | 1/1995 | Kage et al. | 360/96.5 |
| 5,396,381 | 3/1995 | Yamano et al. | 360/96.5 |

FOREIGN PATENT DOCUMENTS 88057267  6/1988  Germany .

*Primary Examiner*—John P. Darling
*Attorney, Agent, or Firm*—Brian J. Wieghaus

[57] ABSTRACT

A magnetic tape cassette apparatus with a cassette holding mechanism which minimizes the deforming stress on the holding parts. While a cassette is in an intermediate position, between ejected and held, minimal forces are applied, thereby reducing stress if the cassette is left in this intermediate position for a prolonged period. Also included in this mechanism is a detent which prevents the lateral movement of the mechanism while a cassette is being inserted.

4 Claims, 4 Drawing Sheets

MAGNETIC TAPE CASSETTE APPARATUS WITH DRIVE

The invention relates to a magnetic tape cassette apparatus with a drive which comprises a loading mechanism for magnetic tape cassettes having winding openings in their outer wails for accessing magnetic tape spools with spool centres provided in said cassettes, through which openings winding mandrels of the drive as well as a hook of a cassette holder, which is supported in insertion direction in a wall of a cassette lift, can be inserted, such that the cassette holder hook in the ejection position of the drive enters that winding opening which is in front during insertion of a cassette and remains therein until the cassette is lowered into the playback position or is pulled from the drive.

A drive for magnetic tape cassette apparatuses is known from DE 88 05 726.7 U1 (PHD 88.084). The loading mechanism of the drive has a U-shaped cassette compartment formed by an upper and a lower cover plate which are interconnected at a longitudinal side by means of a transverse wail which interconnects the cover plates at an interspacing which corresponds to the cassette height. The interspacing of the cover plates is so set that a magnetic tape cassette can slide between the cover plates with a slight clearance. The cassette compartment is articulated to a cassette lift which can rotate about bearing points in the frame. When the cassette lift is rotated into the lower position, the cassette compartment is also lowered (playback position). The cassette lift comprises a longitudinal groove which extends in the insertion direction of the magnetic tape cassette and in which a slide of a cassette holder is supported. This cassette holder comprises a hook-shaped part which can enter an winding opening of a magnetic tape cassette. The slide has a stud which engages an ejection lever which can transport the cassette from an ejection position into a lowering position above the playback position.

When a magnetic tape cassette is inserted into the cassette compartment, the cassette holder will first slide on the upper wail of the cassette, whereby it is elastically deformed. Then the holder drops into the winding opening which is in frontmost position in the insertion direction in the so-called ejection position, whereby the elastic deformation is eliminated. If the cassette is not inserted far enough, the cassette holder will remain with its hook on the upper cassette wall, so that the entire cassette holder is plastically deformed as a result of the deformation forces which may be active for days on end, depending on the circumstances.

When the cassette is ejected, it is held in its winding opening by the outward-moving cassette holder, so that it cannot drop from the drive. It may happen, however, that the hook of the cassette holder leaves the winding opening of the cassette owing to the dynamic force of the cassette during ejection from the winding opening and slides onto the upper wall of the cassette, where it is then plastically deformed again in the long run, whereby the retaining function of the cassette holder is adversely affected. It is possible in such a mechanism to prevent the inadvertent sliding of the cassette holder hook from the winding opening of the cassette through an increase in the retaining force arising from the elastic deformation of the cassette holder, but this has the result that the cassette holder is moved into the drive by the cassette during insertion before the cassette holder hook has slid onto the upper wail of the cassette. This has the consequence that the automatic cassette insertion is started although the cassette has not yet been correctly inserted.

It is an object of the invention to design the cassette holder mechanism such that the plastic deformation with the hook of the cassette holder on the upper cassette wall is avoided, while at the same time an inadvertent premature insertion of the cassette holder is avoided.

According to the invention, this object is achieved in that the cassette holder can pivot in its support in vertical direction without deformation, and the force necessary for retaining the cassette by means of the cassette holder during ejection originates from a metal spring bearing on the cassette holder and so shaped that the force holding down the cassette holder no longer acts on the cassette holder after a small path travelled by the cassette holder in the cassette insertion direction and allows said cassette holder to slide over the upper cassette wall substantially free from forces acting thereon, while a detent which is active only in this intermediate position achieves that the cassette holder cannot be further inserted until after the cassette holder hook has entered the winding opening of the cassette.

The pivotable support arrangement of the cassette holder means that the latter can pivot substantially without deformation during cassette insertion. It is necessary for this, however, that the deforming force of the cassette holder cannot be used for retaining the magnetic tape cassette during ejection. The force required for retaining the magnetic tape cassette during ejection is exerted by a metal spring which acts on the cassette holder. This spring is constructed so as to have two levels at its end and can act on the cassette holder with an upper tip and a lower tip. When the cassette is pressed against the cassette holder during insertion, the cassette holder pivots, is pushed back a little, and slides onto the upper cassette wall. The cassette holder hook slides from the lower tip to the upper tip of the metal spring during this, and the latter will now bear on the cassette holder with only a reduced force. When the cassette is inserted further, the cassette holder hook drops into the winding opening of the magnetic tape cassette, the cassette holder hook slides from the upper tip to the lower tip of the metal spring, and the metal spring bears with its full retaining force on the cassette holder.

According to a further embodiment of the invention, the spring forms part of the cassette compartment or cassette lift. This spring is then made from the material already present and does not form an additional component which is to be separately fastened in some way or separately manufactured.

Figure 2:
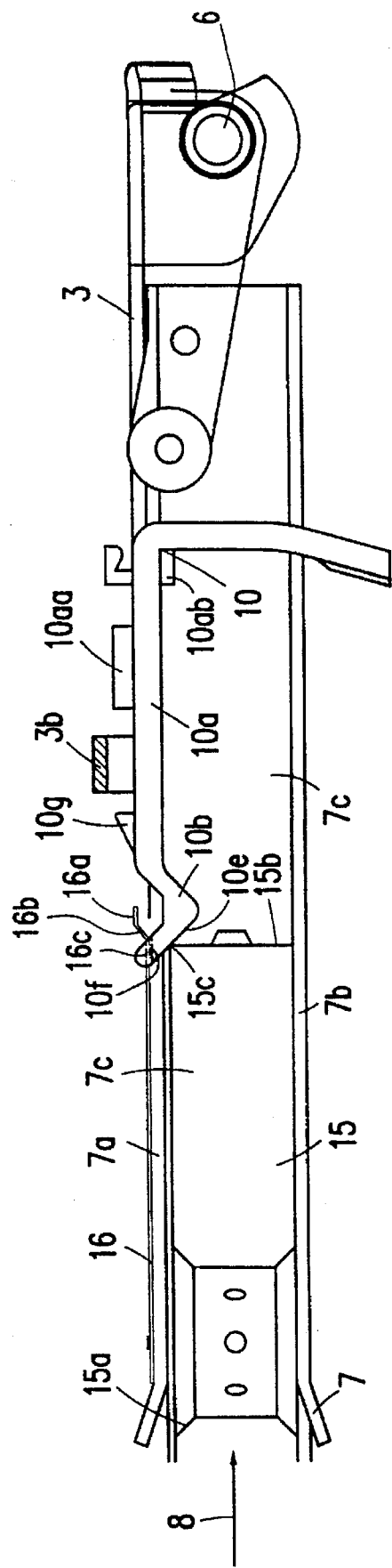
Figure 3:
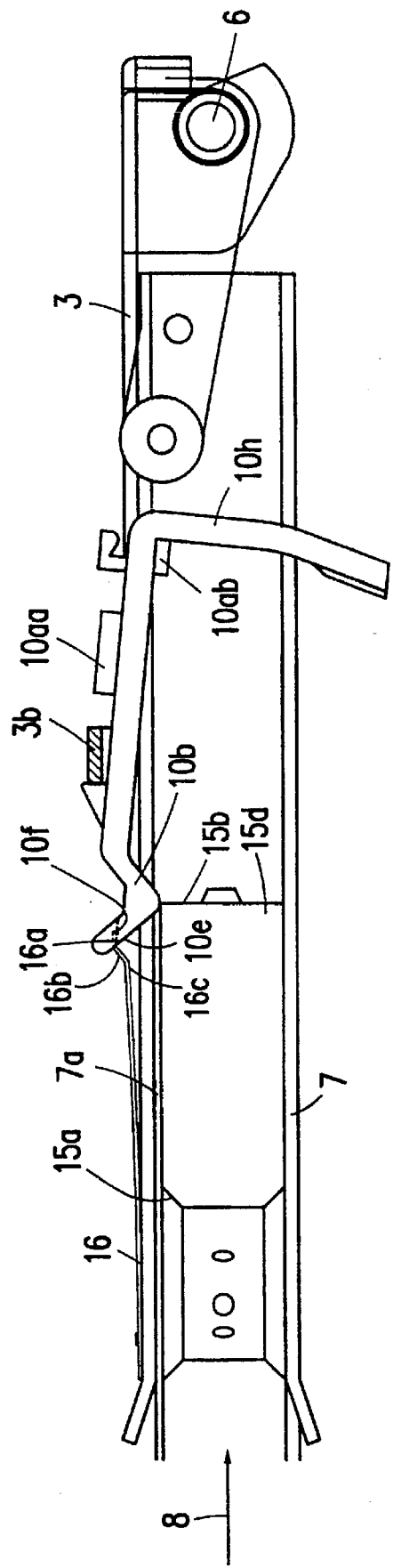
Figure 4:
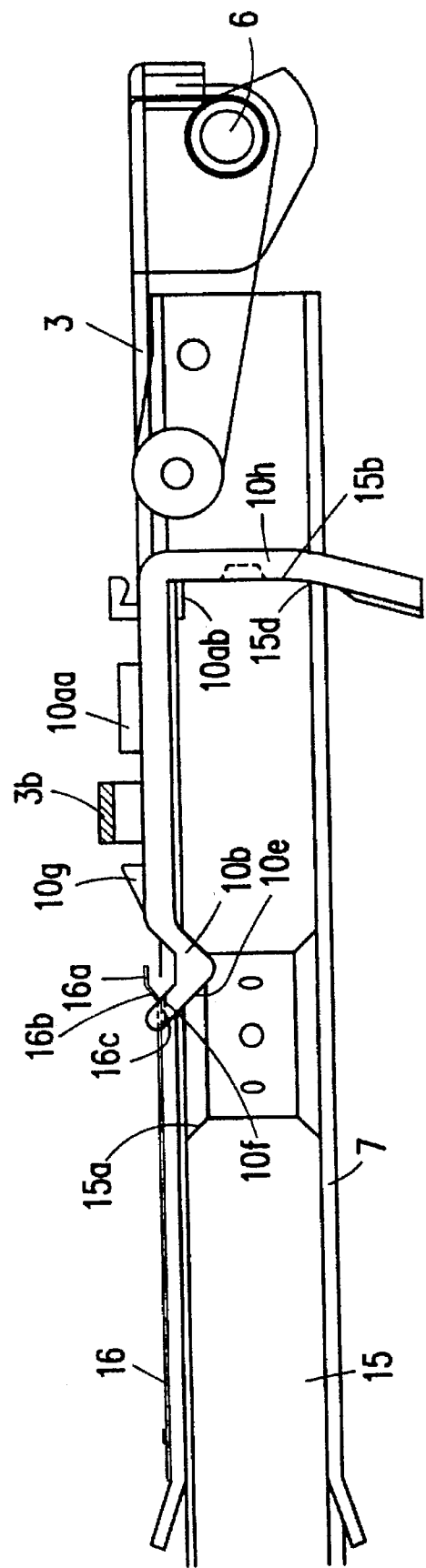

The invention will be explained in more detail with reference to the drawing, in which:

FIG. 1 shows a loading device of the drive of a magnetic tape cassette apparatus in plan view, FIG. 2 shows the loading device in side elevation with the cassette in a position shortly before making contact with the cassette holder for the first time, FIG. 3 shows the loading device in side elevation with the cassette in a position in which the cassette holder has been slightly shifted in the insertion direction and the cassette holder hook is about to slide onto the cassette, and FIG. 4 shows the loading device in a side elevation with the cassette holder hook engaged in the winding opening.

FIG. 1 shows a cassette lift 3 articulated to a frame 1 of a drive for a magnetic tape cassette apparatus. The drive is constructed in particular for use in a motor vehicle. The cassette lift 3 is articulated to the frame 1 by means of bearing eyelets 6. A cassette compartment 7 is suspended from the cassette lift 3 by means of hinge pins 3a thereof and hinges (not shown). This lift comprises an upper cover plate 7a to which a cassette holder spring 16 is fastened. A further cover plate To is arranged parallel to and below the cover plate 7a. The two cover plates 7a, 7b are interconnected at their rear edges by means of a transverse wall 7c. A groove 9 extends in the cassette lift 3 in the insertion direction for a magnetic tape cassette 15, as indicated by an arrow 8. A cassette holder 10 is guided with sliding possibility in this groove 9. A central piece 10a with a frontmost support portion 10aa at the upper side and a rearmost support portion 10ab at the lower side serve to achieve this guidance. A cassette holder hook 10b extends in a direction opposed to the insertion direction 8 away from the central piece 10a inside the groove 9. This hook has a V-shape or a hook shape and is capable of entering a winding opening 15a of the cassette 15, as is shown particularly clearly in FIG. 4. A metal spring 16 acts on the cassette holder hook 10b. This metal spring 16 is constructed with two levels at its end bearing on the cassette holder hook 10b. It has an upper tip 16a and a lower tip 16c *interconnected* by a sloping wall 16b. At the side opposite to the cassette holder hook 10b, an extension arm 10c is provided in the groove 9, which arm also engages the central piece 10a and which supports a pin 10d. The extension arm 10c also lies freely in the groove 9. The pin 10d passes through a slot 11a of an ejection lever 11. This ejection lever 11 is rotatable about a mandrel 12 which is fixed to the frame 1. When pivoted in clockwise direction, the ejection lever 11 moves the loading mechanism into a position above the playback position and, in the opposite direction, from the playback position into the ejection position again in a manner which is not shown in any detail. The ejection position is shown in FIGS. 1 and 4. The ejection position is that position of the cassette holder hook 10b and of the ejection lever 11 in which the cassette holder hook 10b enters the frontmost winding opening 15a of a magnetic tape cassette (FIG. 4) upon the manual insertion of this cassette. From there, when the magnetic tape cassette is further inserted, the cassette holder hook 10b is moved in the insertion direction 8, whereby it takes along and pivots the ejection lever 11 so far that first the insertion movement is taken over by a mechanical insertion process, and this mechanical insertion process moves the cassette compartment into the playback position. The position of the cassette holder hook 10b and of the ejection lever 11 shown in FIG. 4 is that position, moreover, which the ejection lever 11, cassette holder hook 10b, and magnetic tape cassette 15 enter when the ejection lever 11 pivots in anticlockwise direction through the depression of an ejection button (not shown) so as to bring the cassette compartment 7 and the magnetic tape cassette 15 in the ejection position again, in which the magnetic tape cassette 15 remains and is further retained by the cassette holder hook 10b. It is not until the magnetic tape cassette 15 is manually pulled out that the cassette holder hook 10b is forced from the winding opening 15a of the magnetic tape cassette 15, and the magnetic tape cassette 15 can be fully taken out.

FIG. 2 shows the loading device in side elevation with the magnetic tape cassette 15 in a position shortly before the first contact with the cassette holder 10. The narrow side 15b of the cassette 15 lying in front in the insertion direction has just hit with its upper edge 15c against the insertion slope 10e of the cassette holder hook 10b. The cassette holder spring 16 presses with its lower tip 16c against the cassette holder 10 from above and substantially prevents a deviation of the cassette holder 10 in upward direction. When the cassette 15 is further inserted subsequently, the assembly is brought into the position shown in FIG. 3.

FIG. 3 shows the loading device in side elevation with the magnetic tape cassette 15 in a position in which the cassette holder 10 and the magnetic tape cassette 15 have been slightly shifted in the insertion direction 8, and the cassette holder hook 10b is just about to slide onto the magnetic tape cassette 15. The cassette holder 10 is shifted so far relative to the cassette holder spring 16 here that its support wall 10f has just finished sliding along the sloping wall 16b of the cassette holder spring 16. The cassette holder spring 16 now presses with its upper tip 16a against the cassette holder 10. Since it is now the upper tip 16a, not the lower tip 16c, which acts on he cassette holder 10, the force applied to the cassette holder 10 has been clearly reduced. Since the ejection lever 11 presses against the cassette holder 10 in a direction opposed to the insertion direction in a manner not described any further, said holder has been pivoted upwards with its insertion bevel 10e at the upper edge 15c of the cassette. This pivoting movement takes place without deformation of the cassette holder 10, since the latter pivots about its rearmost upper support point 10ab. A further insertion of the cassette holder is not possible at this moment because its abutment wall 10g will lie in front of the bridge 3b owing to the pivoting movement, which bridge blocks a further movement. During further insertion of the magnetic tape cassette 15, the latter will slide below the pivoted cassette holder hook 10b into the ejection position shown in FIG. 4.

FIG. 4 shows the loading device in side elevation with the cassette holder hook 10b engaged into the winding opening 15a. The ejection lever 11 which had previously been slightly pivoted in the insertion direction against the spring pressure owing to the coupling to the cassette holder 10 via bolt 10d, can pivot back as soon as the cassette holder hook 10b enters the winding opening 15a, so that the cassette holder flips back below the lower tip 16c of the cassette holder spring 16 and enters the winding opening 15a of the magnetic tape cassette 15. This position is identical with the position occupied by the mechanism during ejection of the magnetic tape cassette 15 from the playback position. When the magnetic tape cassette 15 is further inserted, its narrow side 15b lying in front in the insertion direction hits with its lower edge 15d against stop 10h of the cassette holder 10, so that the cassette holder hook 10b is pressed against the upper side of the cassette 15 and the abutment wall 10g pivots away from the bridge 3b so far that the cassette holder can move below this bridge without hindrance, so that the cassette can now be completely inserted.

We claim:

1. A magnetic tape cassette apparatus which comprises a loading mechanism for a magnetic tape cassette, said cassette having an outer wall, and an opening in said outer wall, said loading mechanism comprising:

a spring, a cassette holder having a hook for operative engagement in said cassette outer wall opening, said cassette holder assuming a first, second, and third position as said cassette is inserted in said loading mechanism along an insertion direction, characterized in that the cassette holder can traverse through said first, second, and third positions without deformation, and said spring being shaped so as to apply an operative force on said holder for engagement with said cassette when said holder is in said first and third position, and so as to apply a passive force on said holder when said holder is in said second position, said passive force being a substantially less than said operative force.

2. A magnetic tape cassette apparatus as in claim 1, further comprising:

a detent which is operatively engaged only when said holder is in said second position, preventing a displacement of the holder along the insertion direction until said holder is in said third position.

3. A magnetic tape cassette apparatus as in claim 1, characterized in that the loading mechanism further comprises a cassette compartment and said spring forms part of said compartment.

4. A magnetic tape cassette apparatus as in claim 1, characterized in that the loading mechanism further comprises a cassette lift and said spring forms part of said lift.

* * * * *